United States Patent [19]

Lyras

[11] Patent Number: 5,185,968
[45] Date of Patent: Feb. 16, 1993

[54] MOBILE SEPARATION SYTEM FOR ABRASIVE BLASTING MATERIAL

[75] Inventor: Gus G. Lyras, Lowellville, Ohio

[73] Assignee: Corcon (Ohio corporation), Lowellville, Ohio

[21] Appl. No.: 721,700

[22] Filed: Jun. 26, 1991

[51] Int. Cl.⁵ .............................................. B24C 1/00
[52] U.S. Cl. ........................................ 51/319; 51/424; 51/425
[58] Field of Search .................. 51/410, 424, 425, 319

[56] References Cited

U.S. PATENT DOCUMENTS

| | | | |
|---|---|---|---|
| 2,810,991 | 10/1957 | Mead et al. | 51/425 |
| 3,716,946 | 2/1973 | Graf | 51/425 |
| 3,858,359 | 1/1975 | Leliaert | 51/425 |
| 3,934,374 | 1/1976 | Leliaert | 51/425 |
| 3,981,104 | 9/1976 | Dreher | 51/425 |
| 4,080,760 | 3/1978 | Leliaert | 51/425 |
| 4,382,352 | 5/1983 | Nelson | 51/424 |
| 4,433,511 | 2/1984 | Swain | 51/424 |
| 4,449,331 | 5/1984 | MacMillan | 51/425 |
| 4,693,041 | 9/1987 | Dickson | 51/424 |
| 4,773,189 | 9/1988 | MacMillan et al. | 51/425 |
| 4,943,368 | 7/1990 | Gilbert et al. | 51/425 |

Primary Examiner—Douglas D. Watts
Assistant Examiner—Hwei-Siu Payer
Attorney, Agent, or Firm—Harpman & Harpman

[57] ABSTRACT

A process and apparatus for the separation and recovery of used abrasive blasting material having intrained contaminates, recovered from a work site. The intrained contaminates are removed by a self-contained multi-step separation process using magnetic and air wash separation apparatus interconnected by transfer and storage bins.

4 Claims, 3 Drawing Sheets

MOBILE SEPARATION SYTEM FOR ABRASIVE BLASTING MATERIAL

BACKGROUND OF THE INVENTION

1. Technical Field

This device and process relates to separation systems developed to recycle steel abrasive blast material by removing contaminates such as dust, paint, rust, etc. created during the pressure blasting process in which it is used.

2. Description of Prior Art

Prior Art devices and processes of this type have relied on a variety of fixed and mobile separation apparatus that require the spent contaminated abrasive material either to be transported to a separate site and processed or processed on site on a continuing in use basis such as would be found in a closed circulating system, see for example U.S. Pat. Nos. 4,943,368, 4,773,189, 4,449,331, 3,716,946 and 2,810,991.

In U.S. Pat. No. 4,943,368 a non-metallic abrasive blasting material recovering process is disclosed having multiple steps of size classification, ferro-magnetic separation, gravity separation and electrostatic separation which is used in the separation of non-conductive paint from conductive blasting media.

U.S. Pat. No. 4,773,189 is directed to a separation system for polymeric blasting media which is cited to show multiple tasks separation system in which a contaminated blast product are collected, processed and reused in a continuous manner. The hazardous contaminates being directed to separate disposable storage units within the process.

U.S. Pat. No. 4,449,331 shows a shot blasting machinery used in communication with a blast cabinet module. The device is characterized by a feed and lift conveyor recirculating system in communication with the blast cabinet for transportation of spent contaminated shot to the top of a vertical separation stack.

Prior Art U.S. Pat. No. 3,716,946 uses a recirculation closed system with air separation as the initial separation with a secondary magnetic separator for removal of ferrous shot from the remaining non-ferrous contaminates.

Finally, in U.S. Pat. No. 2,810,991 an abrasive blasting apparatus is disclosed that provides for a movable self-contained blasting and separation unit that recovers the spent contaminated shot as it is used and recirculates same through a reseparation process. The separator uses an air driven grit reclaimer in combination with a transfer chamber.

Prior art also shows mobile self-contained blasting units such as the Alpha 2000 Series manufactured by IPEC which is an attempt to provide a self-contained mobile separator in which interconnected steps are untilized to classify and clean shot from the contaminated material.

SUMMARY OF THE INVENTION

A waste separation process and apparatus for physically removing waste contaminate materials from the residue of abrasive steel shot blasting. The separation apparatus and process used within comprises a self-contained mobile treatment device using a multiple step separation process. A modified magnetic particle separator and multiple air wash separation process is used to separate the steel shot blast material remaining from foreign intrained contaminates. The cleaned blast material is then stored within the apparatus for later transfer and reuse.

DESCRIPTION OF THE PREFERRED EMBODIMENT

Figure 1:
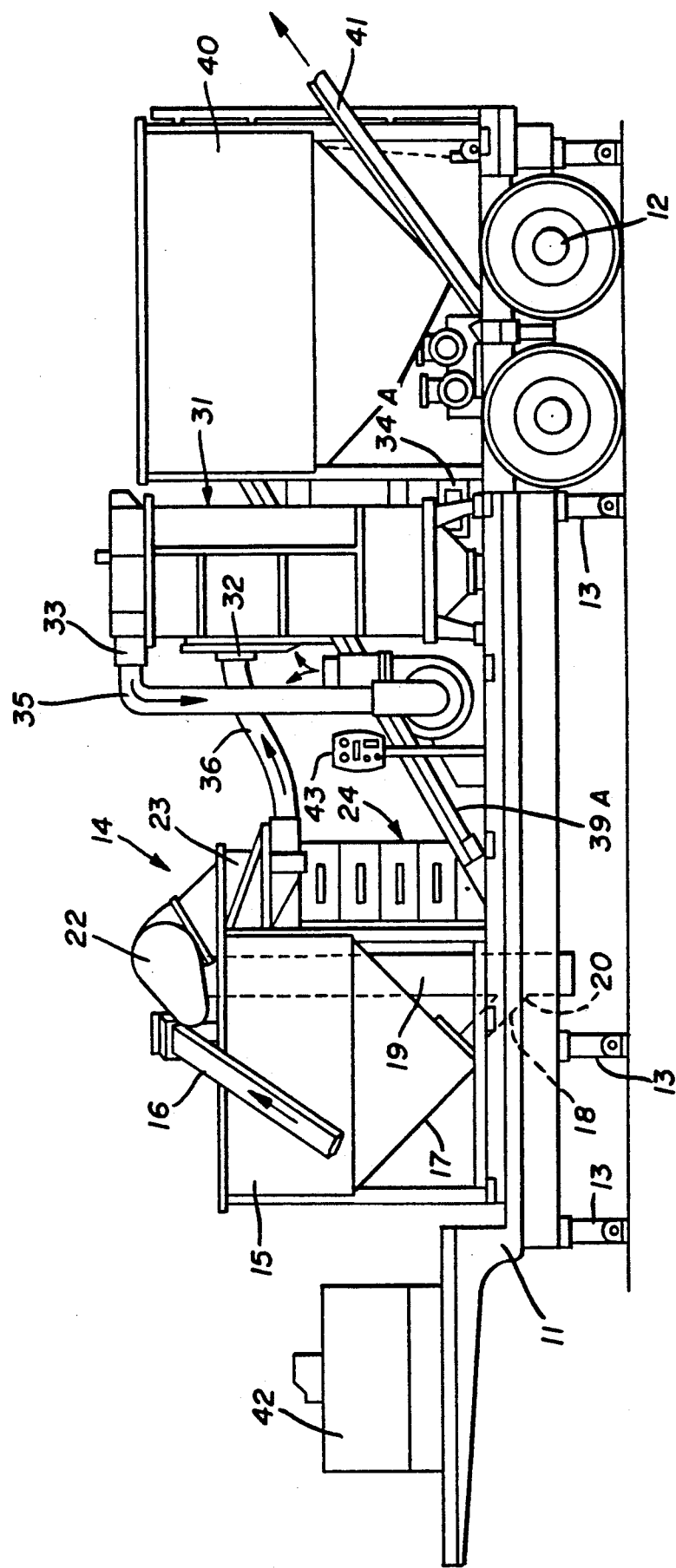
FIG. 1 is a side plan view of the mobile separator.

A process and mobile apparatus for separation and recovery of steel blasting shot materials 10, the mobile apparatus comprises a self-contained trailer 11 having wheels and axle assemblies 12, multiple telescopically extensible trailer stabilizer arms 13 extend from said trailer 11 and can be deployed therefrom stabilizing the trailer 11 during use. A separator apparatus 14 is mounted on said trailer 11 and comprises unclassified grit holding bin 15 into which used abrasive blast material 10 is internally deposited via supply conveyor 16 which will be described in greater detail later. The grit holding bin 15 has a conical lower portion 17 with an outlet gate and trough 18. A bucket elevator 19 having an infeed hopper 20, best seen in FIG. 1 of the drawings, is aligned with the gate and trough 18 and extends through said grit holding bin 15, lifing said used abrasive blasting material 10 with intrained contaminates for delivery to the separation stage of the device.

The bucket elevator 19 is typical within the art and is characterized as having an endless belt 20A with a multiple material buckets 21 positioned thereon. An example of same is available through Universal Industries of Cedar Falls, Iowa as Model No. UI-220 having a free flowing material capacity of 220 CFH's. A drive motor assembly 22 drives the bucket elevator 19 as best seen in FIG. 1 of the drawings.

Figure 5:
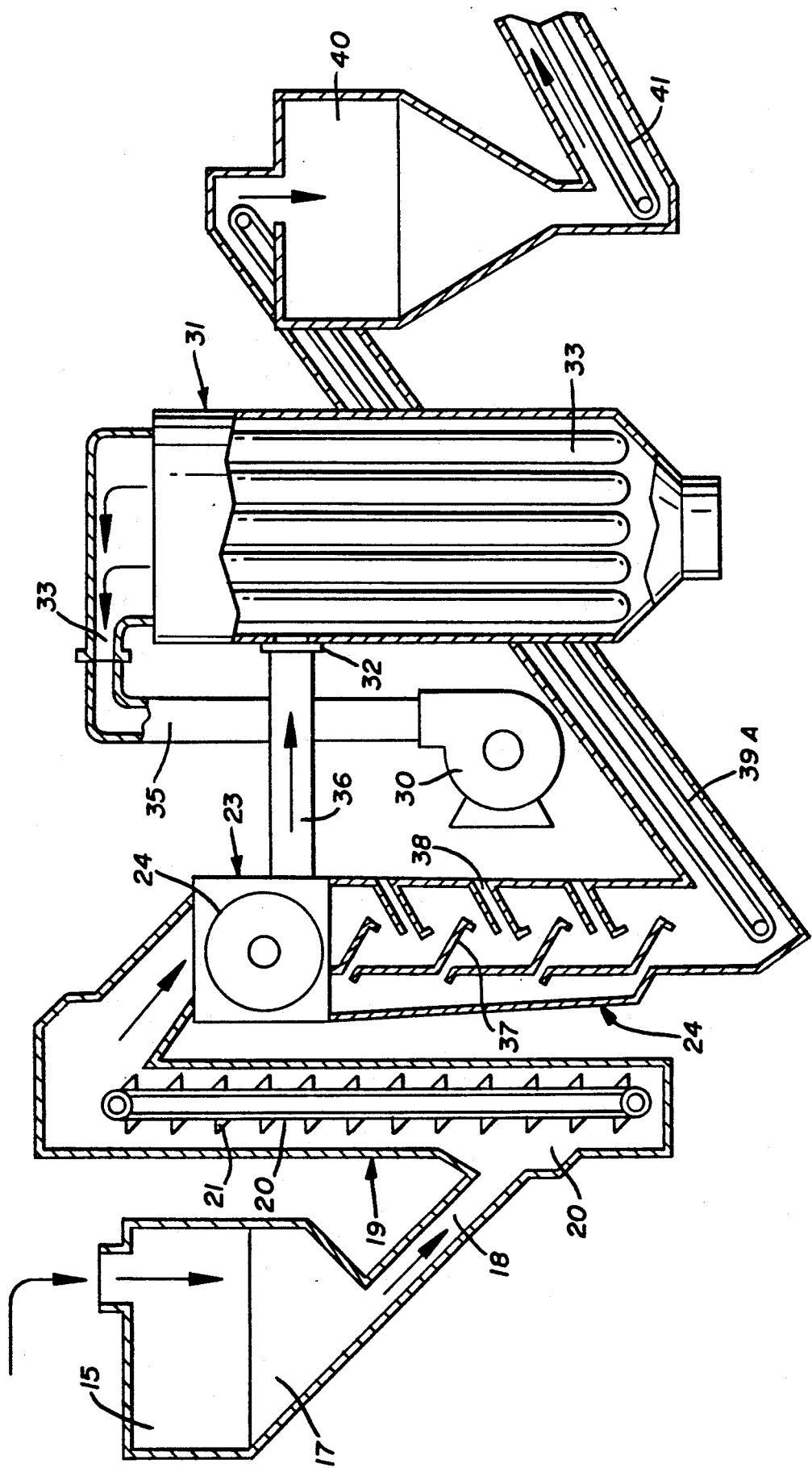
FIG. 5 is an illustrative flow path diagram showing in modified cross-section the complete separation system.

Referring now to FIG. 5 of the drawings, the process flow path for the used abrasive 10 is shown through the mobile apparatus for illustration purposes only.

Figure 2:
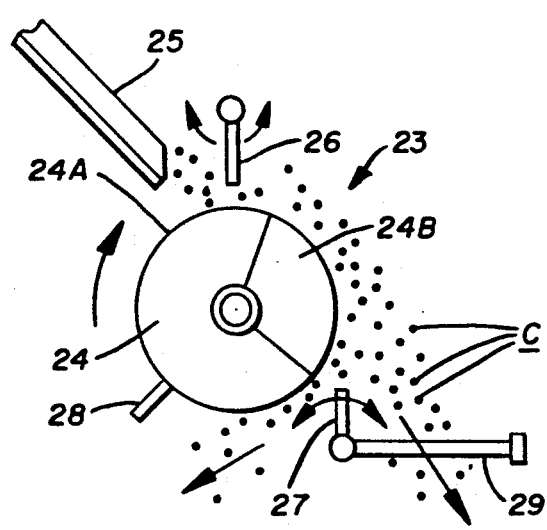
FIG. 2 is a graphic illustration representing a magnetic separator used within this apparatus.

The separation stage comprises a initial magnetic drum separator 23 and multi-air washer 24, best seen in FIG. 2 of the drawings. The magnetic drum separator 23 is a modified improved form of a typical magnetic separation device available to those within the art, an example is known as a Perma Drum Type FC supplied Dings Company of Milwaukee, Wis.

The magnetic drum separator 23 has a drum 24 and a shute 25 with a feed lever arm 26 and a adjustable product outlet splitter 27. A portion of the drum's surface 24A is magnetized at 24B so that as the contaminated used abrasive blasting material 10 is supplied to the drum's surface 24A, non-magnetic contaminates C will be separated therefrom and diverted by the adjustable splitter 27 as is well known within the art. An additional improved wiper blade assembly 28 is adapted to engage the drum surface 24A past the normal point of separation to assure that the ferrous material is cleaned from the drum 24 as it rotates. An improved remote adjustable handle 29 is also added to provide outside adjustment to the product outlet splitter 27 normally found on this type of magnetic separator.

The contaminates C separated by the magnetic drum separator 23 are removed by a vacuum dust control system interconnected to the separation stage through the magnetic drum separator 23 as seen in FIGS. 1 and 5 of the drawings.

The vacuum dust control system comprises a central drive fan blower 30 interconnected to a high pressure dust filter 31 having air inlets and outlets 32 and 33 respectively. The high pressure dust filter 31 has multiple filter bags 33A and access door 34 as is well known within the art. An example of such a high pressure filter 31 is manufactured by Kice Industries, Inc. of Wichitaw, Kans. as Model No. HR 24-6.

An air compressor 34A is required for the separation process and specifically for the operation of the high pressure dust filter 31 hereinbefore described as will be well understood by those skilled in the art.

The central drive fan blower 30 is connected to said outlet 33 on the high pressure dust filter 31 via flexible hose 35. A second flexible hose 36 connects the inlet 32 with the magnetic dust separator 23 as noted above.

Figure 3:
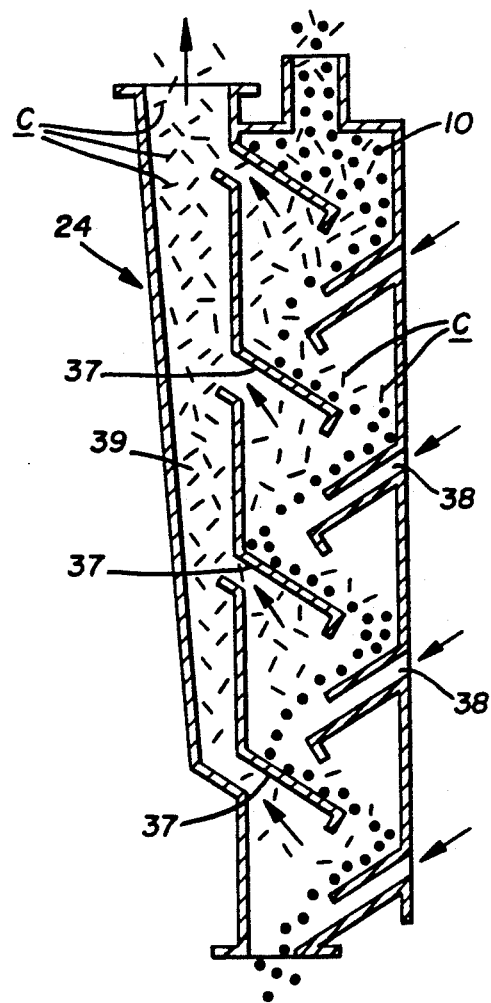
FIG. 3 is a cut-a-way illustrative view of the multiple air wash device used.
Figure 4:
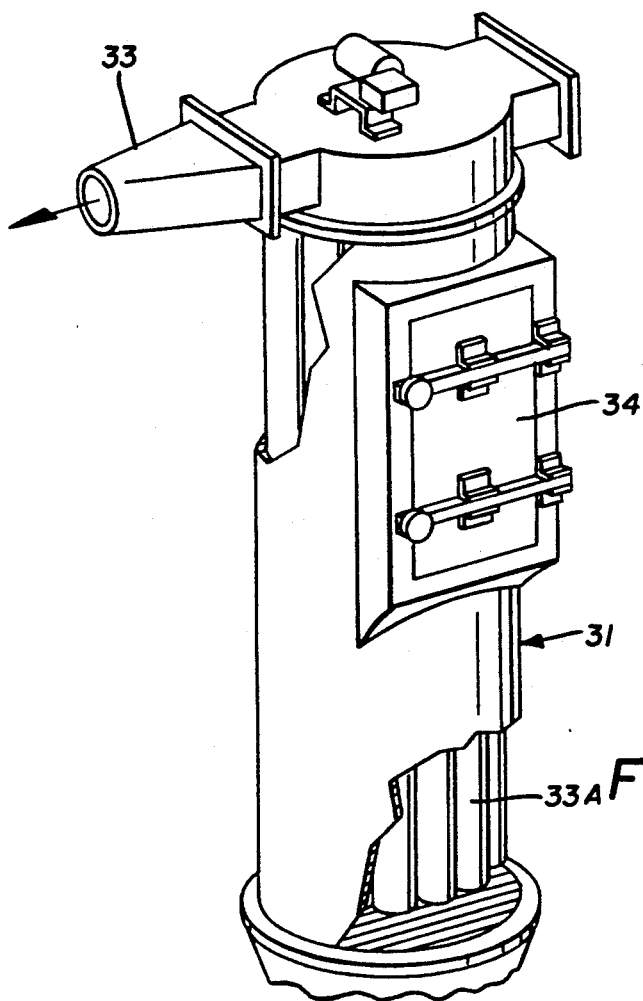
FIG. 4 is a perspective view with parts cut-a-way of a central dust collector.

The products of the magnetic dust separator 23 including the abrasive blast material is directed into the multiple air washer 24 as best seen in FIGS. 3 and 5 of the drawings. The multiple air washer 24 is well known within the art and is comprised of a vertical chamber having multiple deflecting angularly positioned vanes 37 each of which is positioned adjacent an outside air inlet 38 to effect a specific gravity air separation of the contaminated blast material as it cascades downwardly through the air washer 24. The intrained ligher weight contaminates C are forced upwardly through a return and removal passage 39 to be drawn off by the hereinbefore described high pressure dust filter 31 interconnected through said magnetic drum separator 23.

A material conveyor 39A receives separated blast material 10 from the multiple air washer 24 and transfers same to a holding bin 40 positioned adjacent said high pressure dust filter 31.

A secondary material conveyor 41 is positioned on the trailer 11 to receive an outflow of the clean abrasive blast shot material from the holding bin 40 for transfer to mobile transport storage bins (not shown) used within the industry to move the abrasive blast material to the nearby work site, such as a bridge.

In operation, contaminated abrasive blast shot 10 is collected from the work site and transferred to the initial holding bin 15 to begin the separation recycling process.

A diesel generator 42 is positioned on the trailer 11 to provide electrical power through a control and command system (not shown) to the hereinbefore described components of the mobile separation system for abrasive blasting material via a main control panel 43.

While it will be apparent to those skilled in the art that the various individual components of the mobile separation system for abrasive blast and material are each well known and understood, it is this new and novel combination and interdependent adaptation and modification of the given elements in a self-contained mobile system is the subject of the invention.

Only this system allows for reduced load factors and equipment required for use in bridge abrasive blasting which by its very nature loads the structure with additional weight.

It will thus be seen that a new and novel mobile separation system for abrasive blasting material has been illustrated and described and it will be apparent to those skilled in the art that various changes and modifications may be made therein without departing from the spirit of the invention, therefore I claim:

1. An apparatus for separation and recovery of contaminated abrasive blasting material comprises in combination, a self-contained mobile trailer assembly, a separation apparatus on said trailer assembly, said separation apparatus comprising a magnetic separator and an air wash assembly, said magnetic separator having a drum, at least one wiper blade engageable on said drum past a point of contaminate separation, and a remote control product splitter, said air wash assembly having multiple spaced angularly inclined deflecting vanes and associated make-up air inlets, a dust collector interconnected to said magnetic separator and said air washer and a vacuum source for a drawing off contaminates therefrom, transfer and storage means comprising multiple conveyor and storage bins, a source of electrical power and control for said separation apparatus, means for interconnecting said source of vacuum with said dust collector and said magnetic drum separator and air wash assembly.

2. An apparatus for separation and recovery of contaminated abrasive blasting material of claim 1 wherein said dust collector and source of vacuum comprises a high pressure filter having an inlet and an outlet, multiple filter bags and a fan blower interconnected thereto.

3. An apparatus for separation recovery of contaminated abrasive blasting material of claim 1 wherein said source of electrical power comprising a self-contained mobile generator on said trailer assembly and said trailer assembly has multiple stabilizer arms, telescopically extensible therefrom.

4. A process for separation and recovery of contaminated abrasive blasting material wherein said process comprises the steps of
(a) transferring contaminated abrasive blasting material to a mobile self-contained separation recovering apparatus,
(b) separating ferrous and non-ferrous material by a magnetic separator from said contaminated abrasive blasting material,
(c) separating contaminate within said abrasive ferrous material by specific gravity,
(d) removing airborne contaminates from said magnetic separator through a specific gravity separator,
(e) transferring said airborne contaminates to a filter media,
(f) filtering said airborne contaminates and exhausting clean air to atmosphere,
(g) transferring clean abrasive blasting material to a storage bin.

* * * * *